United States Patent Office 2,793,058
Patented May 21, 1957

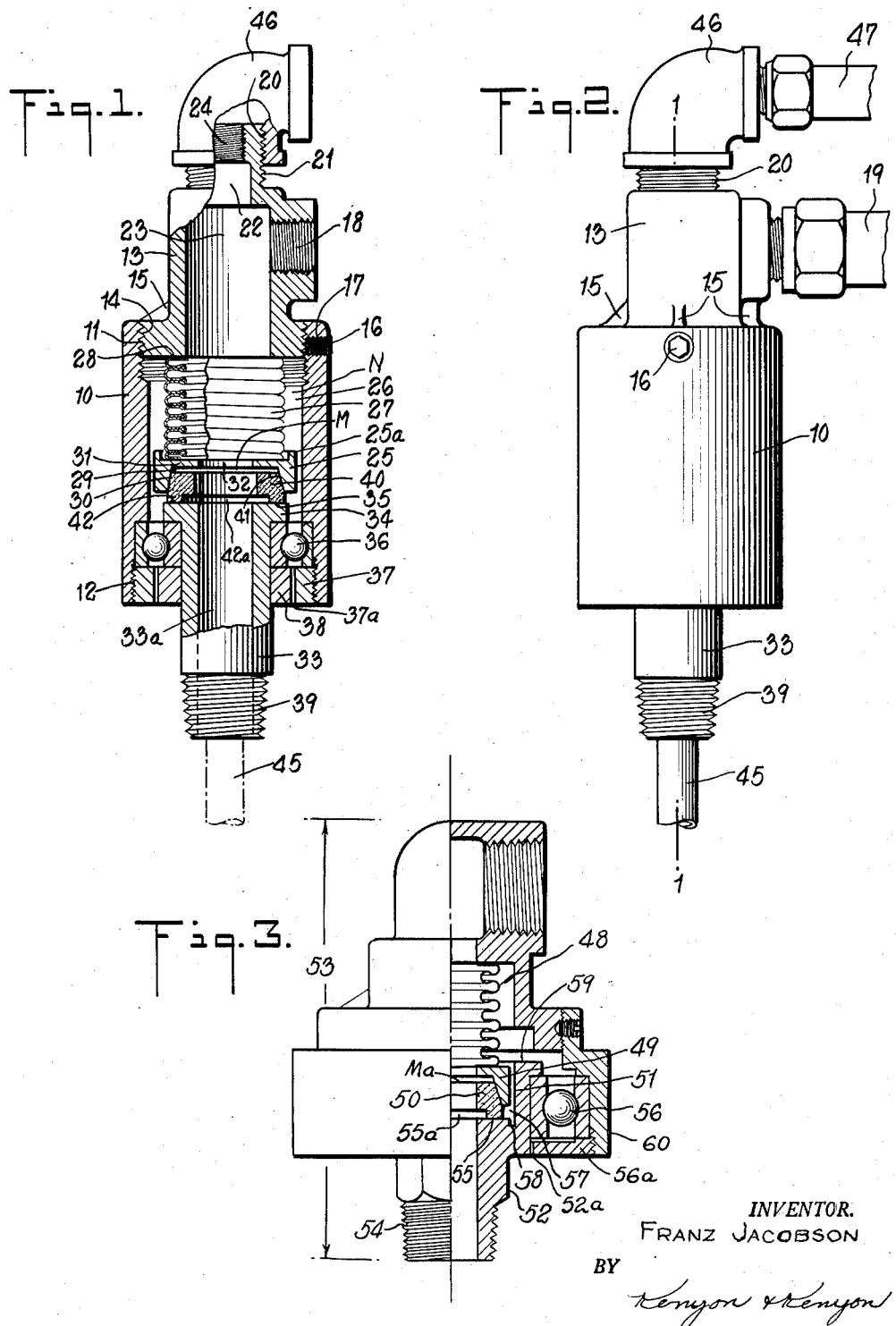

2,793,058
ROTARY JOINT WITH MEANS TO COMPENSATE FOR WEAR OF THE SEAL

Franz Jacobson, New York, N. Y.

Application September 30, 1953, Serial No. 383,255

9 Claims. (Cl. 285—15)

This invention relates to a rotary joint for conveying media such as liquids, gases and vacuum from a stationary conduit to a revolving receptacle such as a drum, cylinder, can or the like.

Principal objects and features of this invention are the provision of a rotary joint that is adjustable by external manipulation to compensate for wear of the seal arrangement in the joint while the joint is in operation and without any interruption of such operation.

Other objects and features of the invention are the provision of a rotary joint involving a floating rotary seal arrangement that is self-aligning in all directions to counteract misalignments of the rotary shaft.

Further objects and features of the invention include the provision in the joint of pressure equalizing chamber in connection with the rotary sealing arrangement, said chamber being large enough to provide sufficient hydraulic pressure to tend to lift one part of the sealing arrangement relative to another and thereby act as a safety valve to relieve excessive pressure by leakage, and said chamber including a recess at the wearing surface of the rotary sealing arrangement so dimensioned that it will counteract the internal hydraulic pressure of the joint up to an amount smaller than the maximum permissible pressure for which the joint is adjusted, the counteraction, however, being small enough to maintain a leak-proof seal at said wearing surface whereby the rotary shaft turns more easily as the internal pressure of the medium conveyed increases and whereby excessive wear and abuse of all parts are prevented.

Additional objects and features of the invention include provision of structural details that involve the use of few parts of small size and a resulting rotary joint that is trouble free and economical in operation.

Other objects and features of the invention will become apparent from the following specifications and the accompanying drawings, wherein:

Fig. 1 is a longitudinal section taken along line 1—1 of Fig. 2 of the device embodying the invention;

Fig. 2 is an elevational view of said device illustrative of one manner of its use, and Fig. 3 is a partial longitudinal section of a device incorporating another form of the present invention.

Referring to the specific form of the invention shown in Figs. 1 and 2, a tubular housing 10 of steel or other suitable material is provided. This housing 10 is internally threaded at 11 and 12 adjacent its opposite ends. A tubular header 13 of bronze or other desirable material is externally threaded at 14 to screw into the internal threading 11 of the housing 10. The header 13 has, for example, four equi-spaced ribs 15 on its outer surface (spaced 90° apart) that function as indicators relative to a set screw 16 that is screwed into a threaded opening 17 in the wall of housing 10 and which is accessible for external operation to permit adjustment of the relative depth of screwing of the header 13 in the housing 10 for purposes presently to be described. The header 13 has a threaded inlet opening 18 to which hose or piping 19 may be removably coupled. The header 13 is externally threaded at 20 in an upper portion 21 of reduced diameter. The reduced diametered portion 21 has an internal bore 22 of smaller dimensions than that of the main bore 23 of the header and the outer end of the bore 22 is internally threaded at 24 for purposes to be presently described.

A support member 25 of smaller diameter than that of the bore 26 of the housing 10 is located inside of the latter. The member 25 has an annular peripheral perpendicular flange 25a defining a receiving recess on the upper face of member 25 into which an end of an elastic tubular element or bellows 27 of spring brass, Monel or other metal is fitted and permanently attached as by welding or soldering to the upper face of said support member 25. The opposite end of said element or bellows 27 is permanently attached as at 28 in similar manner to the internal end face of the header 13. A seal receiving recess 29 having tapering side walls 30 is provided in the bottom face of support member 25. The transverse wall 31 of member 25 has a hole 32 axially aligned with the axis of the bellows 27. The bellows 27 has a smaller overall outer diameter than the bore 26.

The rotary hollow shaft 33 which is to be coupled to a rotary drum, receptacle, can or cylinder (not shown) is preferably of steel and has an enlarged or flanged head 34 that is hardened and is provided with a smooth, substantially flat, wearing face 35. The shaft 33 is carried in the housing 10 on an anti-friction ball bearing 36 or other suitable anti-friction bearing. The bearing 36 is locked in the housing 10 by an externally threaded ring 37 having an internal cylindrical surface. This ring 37 is screwed into the internal threading 12 of housing 10. A collar 38 is fixed to the shaft 33 in any suitable way to prevent the latter's longitudinal shifting. The collar fits into the ring 37 and has a cylindrical surface engageable with the cylindrical surface of ring 37 to prevent lateral shift of the shaft 33 when the bearing 36 begins to wear. The outer end of shaft 33 is threaded at 39 for coupling to the drum, receptacle, can or cylinder (not shown).

A seal ring 40 of self-lubricating material such as graphite-impregnated metal or graphite composition or equivalent material is interposed between the inner end of shaft 33 and the support member 25. This ring 40 has a tapered portion 41 substantially complemental in shape to the wall 30 of support member 25 and a smooth wearing face 42 that rests on the smooth wearing face 35 of the shaft 33 being forced against the latter by the compressive action of spring bellows 27 on member 25. The extent of compression of bellows 27 in turn is controlled by the relative depth of screwed insertion of the header 13 into the housing 10.

The seal ring 40 does not extend into the full depth of recess 29 but is spaced from the lower face of transverse wall 31 of member 25. The unfilled portion of the recess 29 of said member 25 constitutes a pressure equalizing chamber M which is so dimensioned that the pressure of medium within it will counteract to a predetermined degree the total pressure within the bellows 27 plus the spring pressure of the bellows. To this end, the minimum internal diameter of the recess 29 of support 25 must be larger than the effective median internal diameter of the bellows 27.

In order to maintain a leak-proof contact between wearing face 42 of the rotary seal member 40 and wearing face 35 of the shaft, the total hydraulic pressure in equalizing chamber M must be smaller than the sum of the hydraulic pressure in bellows 27 and the compressive pressure created by said bellows 27.

As regards the seal ring 40, the diameter of its bore is slightly larger than that of the bore 33a of rotary shaft 33 and its outer diameter is larger than the said median diameter of the bellows 27. The longitudinal thickness of said ring member 40 is such that on the wearing face 42 which contacts wearing face 35 of shaft 33 there will be sufficient material for constant wear while the opposite end of ring 40 will always be sufficiently spaced from the wall 31 of support member 25 to define the equalizing chamber M. In addition, the seal ring 40 at its wearing face 42 has a recess 42a receding from the wearing face 35 of shaft 33. The diameter of this recess 42a is smaller than the median diameter of the bellows 27. The purpose of recess 42a is to provide a pressure reducing chamber whose effect is in proportion to its diameter. The pressure in this recess 42a counteracts the pressure exerted in chamber M of which recess 42a is a part. By properly dimensioning the diameter of recess 42a, the wear on the wearing faces 35 and 42 can be reduced to a minimum regardless of hydraulic pressure within the joint.

The seal ring 40 has its tapered portion 41 seated in the tapered recess 29 and is normally stationary but it is movable in any direction to the extent permitted by the flexibility of the bellows 27. Thus the ring 40 is in fact self-aligning and capable of adapting itself to misalignments of the rotary shaft 33. Moreover, the fact that neither seal ring 40 nor bellows 27 is in any way positively connected to the rotary shaft 33 protects the seal ring 40 against destructive forces generated by a fast rotating and frequently misaligned shaft 33. This protection greatly prolongs the life of the seal ring 40 and, also, of the wearing face 35 of shaft 33.

It is to be noted that the wearing face 35 of shaft 33 is located in close proximity to the bearing 36. The resulting shortness of the shaft 33 internally of housing 10, reduces eccentric movement of said shaft 33 (if it is misaligned) to a minimum. In other words, in cases of misalignment of shaft 33, the angle which the tilted surface 35 forms with a normal horizontal plane is held to a minimum, thus producing a minimum amount of friction and wear when shaft 33 is in operative rotation.

Another important factor in prevention of leakage and reduction of frictional wear of the seal ring 40 and rotary shaft 33 in the joint is the arrangement for conveyance of the medium through the joint in such manner that all of said medium is completely contained within the bore of shaft 33, the bore of seal ring 40, the hole 32 of support 25, the interior of bellows 27, and the bore 23 of header 13. The medium conveyed through the joint cannot enter the portion N of bore 26 of housing 10 externally of these parts which is at atmospheric pressure. Frictional wear of seal ring 40 and of shaft 33 is kept to a minimum by the fact that the surface speed at the inner diameter of the wearing surface 42 of seal ring 40 is slower than that at its outside diameter. At the points of greatest surface speed and greatest frictional wear, namely, at the periphery of wearing surface 42 of seal ring 40, no leakage can possibly occur because along that peripheral line, which lies in chamber N, there is no medium seeking to escape into the surrounding atmospheric air in said chamber N. The space 37a between ring 37 and collar 38 serves as a vent to the atmosphere for any material in chamber N.

The small inside diameter of the bore seal ring 40, which is only slightly larger than the bore 33a of rotary shaft 33 and the small overall outside diameter of the said seal ring 40 are responsible in part for the exceptionally small diameter and light weight of the entire rotary joint construction. This light weight reduces the kinetic energy and the pounding that results from fast rotation of shaft 33 if the latter is misaligned. Thus the frictional wear of seal ring 40 and of shaft 33 are reduced and long, continuous, trouble and leak-free operation of the rotary joint result.

The rotary joint described is applicable for use in syphon-type systems wherein return flow of condensed water may be effected, or for systems where no return flow of condensate is required. In a syphon type system, a syphon tube 45 (only partially shown) of smaller diameter than that of the bore 33a of rotary tube 33 is inserted axially into the joint and its threaded end screwed into the internally threaded portion 24 of the header 13. The other end of said tube extends into the revolving drum, receptacle or can (not shown) with which shaft 33 is connected. A nipple or elbow 46 is screwed onto the externally threaded portion 20 of the header 13 and its outlet is connected to a hose or conduit 47. In this syphon-type system, flow of medium through the rotary joint is as follows: From inlet 18 on header 13, through its bore 23, through the bore of bellows 27, through hole 32 of member 25, through the bore of seal ring 40, through the bore 33a of shaft 33 leaving the latter at 39 and entering the revolving drum, receptacle, container or can (not shown). The condensed water returning from the drum, container, can or receptacle (not shown) flows in opposite direction through syphon tube 45 to elbow 46 and out to conduit 47.

Where no return flow of condensate is required, the elbow 46 is replaced by an internally threaded closure cap (not shown) of conventional type screwed onto the externally threaded portion 20 of header 13 and the syphon tube 45 is omitted. The flow of medium to the drum, receptacle, container or can (not shown) in such event is, however, the same as that described for the syphon system.

One of the major features of the invention is effected by the capability of external, manipulative, screwing adjustment of the header 13 relative to the housing 10 to compensate for wear of the seal ring 40 and of shaft 33. To effect such adjustment, it is merely necessary to loosen the set screw 16 and screw header 13 deeper into the housing 10 and then retighten the set screw 16. The position of ribs 15 relative to set screw 16 serves as an indication of the relative adjustments that have been made. The same external adjustability provides a further important advantage in that thereby the bellows 27 can be set to predetermined compression whereby the rotary joint may be adapted for use for any internal hydraulic pressure up to the maximum capacity of the bellows. In other words, by reason of the external screw adjustability of the header 13 relative to the housing 10, the rotary joint can be adjusted during operation and without interruption of operation to operate at any desired maximum pressure that is within the capacity of the bellows 27. If after adjustment, the maximum internal pressure for which the bellows is adjusted is exceeded, the bellows will be lifted (by the compression exerted by excessive internal pressure of the medium flowing) from the seal ring 40 or the latter from shaft 33 and thus cause leakage, thereby acting as a safety valve. The ribs 15 serve as indicators of the adjusted setting of the joint.

To insure proper function as a safety valve, it is important that the tapered conical surface 41 of the seal ring 40 be smooth and concentric to fit in seep-proof manner against the conical wall 30 of recess 29 of support 25. Moreover, the slope or incline of the conical wall must be such as to permit easy lifting of member 25 from the seal ring 40 the moment the internal hydraulic pressure exceeds the permissible maximum. The axial thickness of seal ring 40 is, of course, made sufficient so that the tapered wall 41 is long enough to automatically guide the support member 25 into leak-proof reseating position with seal ring 40 and into leak-proof reseating of ring 40 on the wearing surface 35 of rotary shaft 33 when the internal pressure has again been reduced to the permissible maximum as set by the relative predetermined degree of compression of the bellows 27.

In the form of the invention shown in Fig. 3, the bellows 48, support member 49 and seal ring 50 are positioned within the enlarged counterbore 51 in the upper enlarged end of the rotary tubular shaft 52 whereby the overall length 53 of the device is considerably reduced, as compared with the embodiment depicted in Figs. 1 and 2, substantially decreasing the bending moment upon the rotary shaft which is engaged at its threaded end 54.

The seal ring 50 rests on and engages the wearing surface 55 provided by a shoulder located within the counterbore 51. The shoulder or wearing surface 55 of shaft 52 is located in approximate horizontal alignment with bearing 56 and very close to shaft end 54. Due to this construction and arrangement, the rotary tubular shaft 52 of Fig. 3 is shorter than the similar shaft 33 shown in Fig. 1, and the seal ring 50 and its complemental wearing surface 55 on the end of shaft 52 are much closer to the attaching end 54 of shaft 52 than in the case of the corresponding elements shown in Fig. 1 of the drawing, whereby wobbling of said wearing surface 55 is reduced to a minimum if shaft 52 is misaligned with reference to adjoining equipment. Wobbling of the wearing surface 55 is one of the principal causes of leakage.

Support member 49, of smaller diameter than that of the counterbore 51, is located inside of the latter. The elastic tubular element or bellows 48 is mounted in the housing 60 in a similar manner as in the embodiment of Fig. 1, as described above, and the construction and operation of the support member 49, seal ring 50 and wearing surface or shoulder 55 are similar to the embodiment of Fig. 1 except as herein noted. It is to be noted that the chamber Ma is provided between the inner end of seal ring 50 and the support member 49 and that the recess 55a is provided at the wearing surface 55 of seal ring 50. The chamber 17a corresponds in purpose and function to the chamber M and the recess 55a corresponds in purpose and function to the recess 42a. Support member 49 is radially dimensioned relative to the inner diameter of the counterbore 51 to provide an air space between the outer peripheral surface of support member 49 and the inner cylindrical surface of counterbore 51. This air space communicates with an annular groove 58 formed in the wearing surface 55 at its periphery and extends up to the inner end 59 of rotary shaft 52, thereby insulating bearing 56 against high temperatures of steam or other medium being conveyed through the rotary joint. This feature prolongs the life of the bearing and makes the joint accordingly more dependable. Ring 56a is threadably secured to the housing 60 and holds bearing 56 in position. The space 52a serves as a vent in the same way as vent 37 in Figure 1.

A header similar to the type shown in Figs. 1 and 2 can be used with this particular form of the invention if it is desired for use in syphon-type systems.

This application is a continuation-in-part of the prior application, Serial No. 294,545 now abandoned entitled Rotary Joint, filed on June 20, 1952.

While specific embodiments of the invention have been shown and described, variations in structural detail within the scope of the claims are possible and are contemplated. There is no intention, therefore, of limitation to the exact details shown and described.

I claim:

1. A rotary joint comprising a tubular housing, a tubular shaft having an enlarged inner end, said shaft rotatively supported on its inner end within said housing, the inner end of said shaft containing a smooth, substantially flat wearing surface, an anti-friction bearing positioned for rotatively supporting said shaft in said housing to reduce tilting of said wearing surface to a minimum, a lock ring being rotatably secured to the housing and having an inner surface in bearing relation with the outer surface of the tubular shaft, said lock ring serving to hold the said anti-friction bearing in position and as a stabilizer to counteract excessive lateral movement of the shaft with wear of the anti-friction bearing, a header adjustably screwed into said housing at the other end thereof, an elastic tubular element disposed within said housing and fixed to one end of the header, the other end of said tubular element extending in the direction of said rotary shaft, sealing means positioned between said tubular element and said wearing surface of said shaft under tension and in pressure sealing relationship therewith, said sealing means including a support member secured to said elastic tubular element, said support member having a seal-receiving recess with an apertured transverse wall, a seal ring containing a bore and having a wearing face in contact with the wearing surface of said shaft, said seal ring being adapted to extend into said seal-receiving recess and spaced from the transverse wall, said seal ring having a concentric recess in said wearing face of enlarged cross-sectional area relative to said bore to reduce wear of the wearing surfaces of the seal ring and the shaft, the housing being rotatable relative to the header and shaft when both are held in fixed positions and thereby said housing is adapted to provide external adjustment of tension on the sealing means during operation of the rotary joint.

2. A rotary joint comprising a tubular housing, a tubular shaft having an enlarged inner end, said shaft rotatively supported on its inner end within said housing, the inner end of said shaft containing a smooth, substantially flat wearing surface, an anti-friction bearing positioned for supporting the shaft, a lock ring being rotatably secured to the housing and having an inner surface in bearing relation with the outer surface of the tubular shaft, said lock ring serving to hold the said anti-friction bearing in position and as a stabilizer to counteract excessive lateral movement of the shaft with wear of the anti-friction bearing, a header adjustably screwed into said housing at the other end thereof, an elastic tubular element disposed within said housing and fixedly supported at one end from the header, the other end of said tubular element extending in the direction of said tubular shaft, sealing means between said tubular element and said wearing surface of said shaft under tension and in pressure sealing relationship therewith, said sealing means including a support member secured to said elastic tubular element, said support member having a seal-receiving recess with an apertured transverse wall, a seal ring containing a bore and having a wearing face in contact with the face on an inner end of said shaft, said seal ring being adapted to extend removably into said seal-receiving recess and spaced from the transverse wall, said seal ring having a concentric recess in said wearing face of enlarged cross-sectional area relative to said bore to reduce wear of the wearing surfaces of the seal ring and the shaft, the housing being rotatable relative to the header and shaft when both are held in fixed positions and thereby said housing is adapted to provide external adjustment of tension on the sealing means during operation of the rotary joint.

3. A rotary joint comprising a tubular housing, a tubular shaft supporting means being rotatably secured to said housing and being adapted for rotatably supporting one end of the tubular shaft, a header being rotatably secured to said housing, an elastic tubular element having one end fixed to the header within the housing, sealing means disposed between said element and said shaft under tension and in pressure sealing relationship therewith, said sealing means including a support member secured to said elastic tubular element, said support member having a seal-receiving recess with tapering side walls and a transversely extending apertured wall, a seal ring of self-lubricating material containing a bore and having a tapered portion substantially complemental in shape to said tapering walls being adapted to engage the seal-receiving recess in a spaced position from the transversely extending wall, said seal ring being recessed to form an area of larger cross-sectional area relative to said bore and a protruding flat wearing face in contact with said shaft, the housing being rotatable relative to the header and shaft when both are held in fixed positions and thereby said housing is adapted to provide external adjustment of tension on the sealing means during operation of the rotary joint and means for holding the relative positions of the header and the housing.

4. A unitary rotary joint comprising a tubular housing, a tubular shaft rotatably supported within said housing, a header rotatably secured to said housing and being externally adjustable relative thereto, an elastic tubular element being attached to the header within the housing, sealing means located between said elastic tubular element and said shaft under tension and in pressure sealing relationship therewith, said sealing means including a support member secured to said elastic tubular element, said support member having a seal-receiving recess with tapering side walls and a transversely extending apertured wall, a seal ring of self-lubricating material containing a bore and having a tapered portion substantially complemental in shape to said tapering walls being adapted to engage the seal-receiving recess in a spaced position from the transversely extending wall, said seal ring being recessed to form an enlarged cross-sectional area relative to the bore and a protruding flat wearing face in contact with said shaft, said sealing means and elastic tubular element being spaced from the tubular housing, the housing being rotatable relative to the header and shaft when both are held in fixed positions and thereby said housing is adapted to provide external adjustment of tension on the sealing means during operation of the rotary joint and a set screw positioned in said housing for engagement with the header to prevent rotation therebetween.

5. A rotary joint comprising a tubular housing, a tubular shaft having one end rotatably supported within said housing, a header being rotatably secured to said housing, an elastic tubular element being attached to the header within said housing, sealing means being disposed between said elastic tubular element and said shaft under tension in pressure sealing relation, said elastic tubular element and sealing means being spaced from the tubular housing, said sealing means including a support member having a seal-receiving recess and an apertured transverse wall, the support member being secured to the elastic tubular element, a seal ring containing a bore and having a wearing face in contact with the face of the shaft and being adapted to extend into the seal-receiving recess of the support member but spaced from the transverse wall thereof, said seal ring having a concentric recess in said wearing face of enlarged cross-sectional area relative to said bore to reduce wear of the contacting faces of the seal ring and the shaft, the housing being rotatable relative to the header and the shaft when both are held in fixed positions and thereby said housing is adapted to provide external adjustment of tension on the sealing means during operation of the rotary joint.

6. The rotary joint of claim 5 being further characterized by having the tubular shaft counterbored to a diameter greater than the diameter of the bore of the tubular shaft and the sealing means being disposed within the counterbored section of the tubular shaft.

7. The rotary joint of claim 1 being further characterized by having the enlarged inner end of the tubular shaft counterbored to a relatively larger diameter than the bore thereof, the bottom of said counterbored portion being a smooth, substantially flat shoulder thus forming a wearing surface, the anti-friction bearing being positioned in substantially the same plane as the wearing surface of the shaft, and the sealing means being disposed within the counterbored section of the shaft.

8. The rotary joint of claim 2 being further characterized by having the inner end of the shaft counterbored to a relatively larger diameter than the bore thereof, the bottom of the counterbored portion being a smooth, substantially flat shoulder and thus defining a wearing surface, said wearing surface having a peripheral annular groove separating the wearing surface from the inner wall of the counterbored portion of the shaft, the sealing means being disposed within the counterbored section and said sealing means and elastic tubular element being spaced from the inner wall of the counterbored section to provide an annular air space.

9. The rotary joint of claim 3 being further characterized by having the supported end of the tubular shaft counterbored to a relatively larger diameter than the bore thereof and the sealing means is disposed within the counterbored section of the shaft.

References Cited in the file of this patent

UNITED STATES PATENTS

| | | |
|---|---|---|
| 859,426 | Betz | July 9, 1907 |
| 2,407,745 | Jacobson | Sept. 17, 1946 |
| 2,496,471 | Hornbostel | Feb. 7, 1950 |
| 2,497,183 | Monroe | Feb. 14, 1950 |
| 2,536,793 | Anderson et al. | Jan. 2, 1951 |
| 2,549,951 | Warren | Apr. 24, 1951 |

FOREIGN PATENTS

| | | |
|---|---|---|
| 900,512 | France | July 2, 1945 |